United States Patent
Katsunuma

(10) Patent No.: US 7,103,258 B2
(45) Date of Patent: Sep. 5, 2006

(54) ATTENUATOR DEVICE, AND OPTICAL SWITCHING DEVICE

(75) Inventor: Atsushi Katsunuma, Saitama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/255,891

(22) Filed: Oct. 24, 2005

(65) Prior Publication Data
US 2006/0039669 A1 Feb. 23, 2006

(30) Foreign Application Priority Data
Apr. 25, 2003 (JP) .............................. 2003-122227

(51) Int. Cl.
G02B 6/26 (2006.01)
G02B 6/34 (2006.01)
G02B 6/35 (2006.01)

(52) U.S. Cl. .......................... 385/140; 385/18; 385/24; 385/37; 398/84; 398/87

(58) Field of Classification Search ................. 385/18, 385/24, 37, 140; 359/290–292, 297–298, 359/308, 83–85, 87–88
See application file for complete search history.

(56) References Cited

U.S. PATENT DOCUMENTS

| 5,960,133 | A * | 9/1999 | Tomlinson | 385/18 |
| 6,204,946 | B1 * | 3/2001 | Aksyuk et al. | 398/9 |
| 6,549,699 | B1 | 4/2003 | Belser et al. | 385/24 |
| 2002/0131687 | A1 | 9/2002 | Wilde | 385/24 |
| 2002/0131688 | A1 | 9/2002 | Chen et al. | 385/24 |
| 2002/0131691 | A1 | 9/2002 | Garrett et al. | 385/24 |
| 2002/0176149 | A1 | 11/2002 | Davis et al. | 359/290 |
| 2004/0008932 | A1 * | 1/2004 | Peng et al. | 385/27 |

FOREIGN PATENT DOCUMENTS

| JP | 2002-196173 | 7/2002 |
| JP | 2003-515185 | 4/2003 |
| WO | WO99/46629 | 9/1999 |

* cited by examiner

Primary Examiner—John D. Lee
(74) Attorney, Agent, or Firm—Morgan, Lewis & Bockius, LLP

(57) ABSTRACT

There is provided an attenuator device having a simple configuration and capable of selecting an output of beam of an arbitrary wavelength range from a plurality of output ports. The attenuator device comprises: a plurality of output fibers (1-3 and 1-5) having an end surface serving as an output port; discarding optical fibers (1-2 and 1-4) having an end surface serving as a discarding port and each arranged adjacently to the output optical fiber; a diffraction grating (5) which diffracts an incident beam into various directions according to the wavelength thereof; and a micro mirror array (7) which adjusts the output direction of the diffracted beam for each of the wavelength ranges output from the diffraction grating (5). The micro mirror array (7) adjusts the output direction of the diffracted beam so that a part of the diffracted beam may be output to the output port while the rest being output to the discarding port.

20 Claims, 2 Drawing Sheets

ATTENUATOR DEVICE, AND OPTICAL SWITCHING DEVICE

TECHNICAL FIELD

The present invention relates to an attenuator device and an optical switching device and, more particularly, to an attenuator device and an optical switching device utilizing an offset-dispersion double spectrograph.

BACKGROUND ART

In the prior art, there has been known the attenuator device utilizing the offset-dispersion double spectrograph. This offset-dispersion double spectrograph may also be called the offset-dispersion type double monochromator or the zero dispersion double spectrograph. In the attenuator device utilizing the offset-dispersion double spectrograph, an input beam is sequentially subjected to two wavelength dispersion effects (in the opposite directions), the diffracted beam after receiving the first wavelength dispersion effect and before receiving the second wavelength dispersion effect is subjected to an attenuation operation. Then, the attenuated beam is subjected to the second wavelength dispersion effect and is then output to the outside.

In the attenuator device utilizing the offset-dispersion double spectrograph, as described in JP-A-2002-196173, the attenuation operation is executed by using a micro mirror array. Specifically, the micro mirror array is so configured that the diameters of the individual micro mirrors may be smaller than the spot diameter of beam (to be operated) incident on the micro mirror array, and that the multiple micro mirrors may be arranged in the spot diameter of the beam to be operated. Moreover, the attenuation operations is performed by inclining some of the plural micro mirrors positioned in the spot diameters in directions different from the output direction and by guiding to outside of the optical path, i.e., discarding a part of the beam to be operated. Moreover, the beam discarded at that time is detected by a sensor to monitor the spectral information, so that the number of micro mirrors to be inclined in the directions different from the output direction is controlled on the basis of that spectral information.

In the attenuator device utilizing the offset-dispersion double spectrograph described in JPA-2002-196173, the micro mirror array is so configured that the diameter of the individual micro mirrors may be smaller than the spot diameter of the beam (to be operated) incident on the micro mirror array, and that the multiple micro mirrors may be arranged in the spot diameter of the beam to be operated. This arrangement raises a problem that the configuration of the micro mirror array is complicated.

Moreover, the arrangement imagines the single output port so that it cannot meet the function using the plural output ports selectively.

DISCLOSURE OF THE INVENTION

The present invention has been conceived in view of the background thus far described, and has an object to provide an attenuator device and an optical switching device having simpler configurations. Another object of the present invention is to provide an attenuator device and an optical switching device, which also have a function to select an output of beam of an arbitrary wavelength range from a plurality of output ports.

In order to achieve the above-specified objects, therefore, an attenuator device according to claim 1 comprises an output port, a discarding port arranged adjacently to said output port, diffraction element which diffracts an incident beam in various directions according to a wavelength thereof, and output direction adjusting device which adjusts an output direction of a diffracted beam for each of wavelength ranges output from said diffraction element, wherein said output direction adjusting device adjusts the output direction of said diffracted beam so that said diffracted beam may be output to said output port or said discarding port or so that a part of said diffracted beam may be output to said output port whereas the rest may be output to said discarding port, and wherein said discarding port discards said diffracted beam so that said diffracted beam may not return to the side of said diffraction element.

According to claim 2, an attenuator device of claim 1, wherein said output direction adjusting device adjusts the output direction of said diffracted beam through said diffraction element so that apart of said diffracted beam may be output to said output port whereas the rest may be output to said discarding port, and said diffraction element inversely diffracts the diffracted beam which has been adjusted in the output direction by said output direction adjusting device.

According to claim 3, an attenuator device of claim 2, further comprising detector which detects a quantity of abeam incident on said discarding port, and control device which controls the adjustment of the output direction of the diffracted beam for each of said wavelength ranges in said output direction adjusting device, according to the detection signal of said detector.

According to claim 4, an attenuator device of claim 2, wherein said output direction adjusting device is a micro mirror device including a plurality of micro mirrors configured to have reflection angles made individually adjustable.

According to claim 5, an attenuator device of claim 4, comprising an output optical fiber, and an output lens to be coupled to said output fiber, wherein the end face of said output fiber to confront said output lens forms said output port, and wherein said output direction adjusting device adjusts the output direction of said diffracted beam so that said diffracted beam may be output to said output lens or said discarding port or so that a part of said diffracted beam may be output to said output lens whereas the rest may be output to said discarding port.

According to claim 6, an attenuator device of claim 1, further comprising detector which detects a quantity of a beam incident on said discarding port, and control device which controls the adjustment of the output direction of the diffracted beam for each of said wavelength ranges in said output direction adjusting device, according to the detection signal of said detector.

According to claim 7, an attenuator device of claim 6, wherein said output direction adjusting device is a micro mirror device including a plurality of micro mirrors configured to have reflection angles made individually adjustable.

According to claim 8, an attenuator device of claim 6, comprising an output optical fiber, and an output lens to be coupled to said output fiber, wherein the end face of said output fiber to confront said output lens forms said output port, and wherein said output direction adjusting device adjusts the output direction of said diffracted beam so that said diffracted beam may be output to said output lens or said discarding port or so that a part of said diffracted beam may be output to said output lens whereas the rest may be output to said discarding port.

According to claim 9, an attenuator device of claim 1, wherein said output direction adjusting device is a micro mirror device including a plurality of micro mirrors configured to have reflection angles made individually adjustable.

According to claim 10, an attenuator device of claim 9, comprising an output optical fiber, and an output lens to be coupled to said output fiber, wherein the end face of said output fiber to confront said output lens forms said output port, and wherein said output direction adjusting device adjusts the output direction of said diffracted beam so that said diffracted beam may be output to said output lens or said discarding port or so that a part of said diffracted beam may be output to said output lens whereas the rest may be output to said discarding port.

According to claim 11, an attenuator device of claim 1, comprising an output optical fiber, and an output lens to be coupled to said output fiber, wherein the end face of said output fiber to confront said output lens forms said output port, and wherein said output direction adjusting device adjusts the output direction of said diffracted beam so that said diffracted beam may be output to said output lens or said discarding port or so that a part of said diffracted beam may be output to said output lens whereas the rest may be output to said discarding port.

An attenuator device according to claim 12 comprises an output port, a discarding port arranged adjacently to said output port, diffraction element which combines a plurality of incident beams of different wavelength ranges into one predetermined direction, and output direction adjusting device which adjusts an output direction of a diffracted beam output from the diffraction element, wherein said output direction adjusting device adjusts the output direction of said diffracted beam so that said diffracted beam may be output to said output port or said discarding port or so that a part of said diffracted beam may be output to said output port whereas the rest may be output to said discarding port, and wherein said discarding port discards said diffracted beam so that said diffracted beam may not return to the side of said diffraction element.

According to claim 13, an attenuator device of claim 12, further comprising detector which detects a quantity of a beam incident on said discarding port, and control device which controls the adjustment of the output direction of the diffracted beam for each of said wavelength ranges in said output direction adjusting device, according to the detection signal of said detector.

According to claim 14, an attenuator device of claim 13, wherein said output direction adjusting device is a micro mirror device including a plurality of micro mirrors configured to have reflection angles made individually adjustable.

According to claim 15, an attenuator device of claim 14, comprising an output optical fiber, and an output lens to be coupled to said output fiber, wherein the end face of said output fiber to confront said output lens forms said output port, and wherein said output direction adjusting device adjusts the output direction of said diffracted beam so that said diffracted beam may be output to said output lens or said discarding port or so that a part of said diffracted beam may be output to said output lens whereas the rest may be output to said discarding port.

According to claim 16, an attenuator device of claim 12, wherein said output direction adjusting device is a micro mirror device including a plurality of micro mirrors configured to have reflection angles made individually adjustable.

According to claim 17, an attenuator device of claim 16, comprising an output optical fiber, and an output lens to be coupled to said output fiber, wherein the end face of said output fiber to confront said output lens forms said output port, and wherein said output direction adjusting device adjusts the output direction of said diffracted beam so that said diffracted beam may be output to said output lens or said discarding port or so that a part of said diffracted beam may be output to said output lens whereas the rest may be output to said discarding port.

According to claim 18, an attenuator device of claim 12, comprising an output optical fiber, and an output lens to be coupled to said output fiber, wherein the end face of said output fiber to confront said output lens forms said output port, and wherein said output direction adjusting device adjusts the output direction of said diffracted beam so that said diffracted beam may be output to said output lens or said discarding port or so that a part of said diffracted beam may be output to said output lens whereas the rest may be output to said discarding port.

In order to achieve the above-specified objects, an optical switching device according to claim 19, comprises input port which inputs an incident beam having at least one wavelength component from at least one input port, a plurality of output ports, at least one discarding port arranged adjacently to at least one of said output ports, first diffraction element which diffracts said incident beam in various directions according to the wavelength thereof, output direction adjusting device which adjusts an output direction of a diffracted beam for each of wavelength ranges output from said first diffraction element; and second diffraction element which applies a diffracting effect opposite to that of said first diffraction element, wherein said output direction adjusting device adjusts the output direction of said diffracted beam in accordance with at least one of the intensity and the wavelength range of said each diffracted beam so that said diffracted beam may be output to said plural output ports or said at least one discarding port or so that a part of said diffracted beam may be output to said plural output ports whereas the rest may be output to said at least one discarding port, and wherein said discarding port discards said diffracted beam so that said diffracted beam may not return to the side of said second diffraction element.

An optical switching device according to claim 20 comprises input port which inputs incident beams each having at least one wavelength component from a plurality of input ports, at least one output port, at least one discarding port arranged adjacently to said output port, first diffraction element which diffracts said incident beam in various directions according to the wavelength thereof, output direction adjusting device which adjusts an output direction of a diffracted beam for each of wavelength ranges output from said first diffraction element, and second diffraction element which applies a diffracting effect opposite to that of said first diffraction element, wherein said output direction adjusting device adjusts the output direction of said diffracted beam in accordance with at least one of the intensity and the wavelength range of said each diffracted beam so that said diffracted beam may be output to said output port or said discarding port or so that a part of said diffracted beam may be output to said output port whereas the rest may be output to said discarding port, and in that said discarding port discards said diffracted beam so that said diffracted beam may not return to the side of said second diffraction element.

According to the invention, as has been described hereinbefore, it is possible to provide an attenuator device and an optical switching device having simple configurations. According to apart of the invention thus far described, moreover, it is possible to provide an attenuator device and an optical switching device, which have a function to select the output of beam of an arbitrary wavelength range from a plurality of output ports.

BRIEF DESCRIPTION OF THE DRAWINGS

FIGS. 2(A) to 2(C) represent enlarged diagrams of such a portion of the attenuator device according to embodiments of the invention as includes sensors, optical fibers and a micro lens array, wherein: FIG. 2(A) shows an optical path of the case, in which no attenuation is applied; FIG. 2(B) shows an optical path of the case, in which the attenuation is applied to discard only a part of beam; and FIG. 2(C) shows an optical path of the case, in which the attenuation is applied to discard beam.

BEST MODE FOR CARRYING OUT THE INVENTION

One embodiment of the invention will be described in the following.

Figure 1:
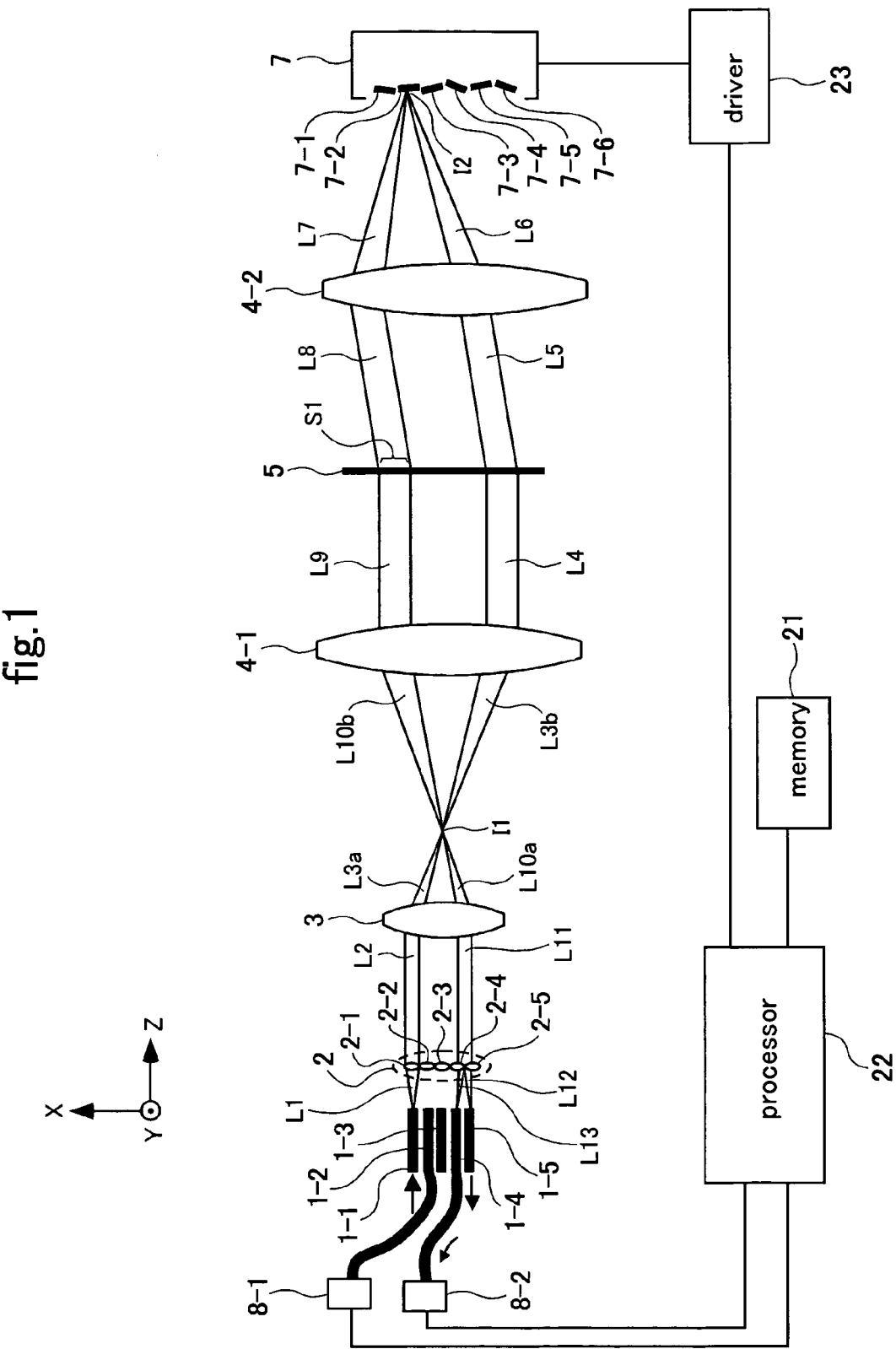
FIG. 1 is a schematic configuration diagram of an attenuator device according to one embodiment of the invention.

FIG. 1 is a schematic diagram of an attenuator device using an offset-dispersion double spectrograph according to one embodiment of the invention.

As shown in the figure, the attenuator device of this embodiment is configured to include: a plurality of optical fibers 1-1 to 1-5; a micro lens array 2; a lens 3; lenses 4-1 and 4-2; a diffraction grating 5; a micro mirror array 7; sensors 8-1 and 8-2; a driver 23 which drives the micro mirror array 7; a processor 22 which gives a command to the driver 23 in response to the outputs of the sensor 8-1 and 8-2; and a memory 21 which stores various programs and data to be used by the processor 22.

In FIG. 1, the direction, in which a beam L2 to be spectrally separated is incident on the channel attenuator device, is set in the "Z direction", and the direction, which is perpendicular to the Z direction and parallel to the surface of the drawing, is set in the "X-direction". Moreover, the direction perpendicular to the X-direction and the Z-direction is set in the "Y-direction". Therefore, the coordinate system shown in FIG. 1 is the righthand system.

The optical fibers 1-1 to 1-5 are the members (e.g., the single-mode fibers), which introduce (as input ports) the beam to be spectrally separated from the beam source (not shown in the figure) into the channel attenuator device, which guide (as output ports) the output beam of the channel attenuator device to the outside, or which guide (as trap ports) the output beam of the channel attenuator device to the sensors 8-1 and 8-2. The beam emitting portions of the optical fibers 1-1 to 1-5 have a diameter of 10 μm, for example.

In this embodiment: the optical fiber 1-1 is used as the input port; the optical fibers 1-3 and 1-5 as the output ports; and the optical fibers 1-2 and 1-4 as the trap ports. Moreover, a beam source which is not shown in the figure is arranged at the upstream stage of the optical fiber 1-1 to be used as the input port.

A multi-wavelength beam L1 (having wavelength ranges of $\lambda 1, \lambda 2, \ldots,$ and $\lambda 6$) emitted from the optical fiber 1-1 or the input port is collimated by a corresponding micro lens 2-1 into the collimated beam L2.

The optical fibers 1-3 and 1-5 or the output ports are arranged individually adjacently to the trap ports 1-2 and 1-4. Specifically, the trap port 1-2 and the output port 1-3 make a pair, and the trap port 1-4 and the output port 1-5 make a pair.

With the trap ports 1-2 and 1-4, there are connected the sensors 8-1 and 8-2. These sensors 8-1 and 8-2 detect the quantities of beams incident on the trap ports 1-2 and 1-4 and send the detection signals to the processor 22.

The micro lens array 2 includes a plurality of micro lenses 2-1 to 2-5, which are arranged to correspond to the optical fibers 1-1 to 1-5, respectively. The micro lenses 2-1 to 2-5 have positive focal distances, which are optimized for the NA (Numerical Aperture) of the optical fibers 1-1 to 1-5. Moreover, the micro lenses 2-1 to 2-5 are so arranged that their own focal points may coincide with the input/output portions of the optical fibers 1-1 to 1-5 corresponding thereto. As a result, the beam emitted from the input port 1-1 is collimated by the corresponding micro lens 2-1, and the collimated beams incident on the micro lenses 2-2 to 2-5 enter the corresponding optical fibers (i.e., the output ports or the trap ports) 1-2 to 1-5.

Now, the collimated beam L2 emitted from the micro lens 2-1 enters the lens 3 and becomes a converging beam L3a so that it is focused as an intermediate image I1 at the focal point of the lens 3. After having passed through the focal point, the beam becomes a diverging beam L3b and enters the lens 4-1 with an enlarged beam diameter. The lens 4-1 is arranged to have the focused point of the intermediate image I1 at the focal point. As a result, a diverging beam L3 is collimated into a beam L4 by the lens 4-1. This collimated beam L4 enters the diffraction grating 5. Here, the collimated beam L4 has the same wavelength ranges of $\lambda 1, \lambda 2, \ldots,$ and $\lambda 6$ as those of the multi-wavelength beam L1.

The diffraction grating 5 focuses spectral images for the individual wavelength ranges of $\lambda 1, \lambda 2, \ldots,$ and $\lambda 6$ of that incident beam at positions corresponding to the diffraction angles of the wavelength ranges. Here, the diffraction grating 5 is a transparent type planar diffraction grating, in which a multiplicity of long slits in the Y-direction are one-dimensionally arranged in parallel with the X-direction. In short, the diffraction grating 7 is arranged in symmetry with respect to the X-Z plane. Here, the array direction of the multiple slits corresponds to the wave dispersing direction of the diffraction grating 5. In FIG. 1, only one optical path of one of the wavelength ranges contained in the multi-wavelength beam L1 is displayed so as to facilitate the grasp of the dispersion passage of a beam.

Now, the collimated beam L4 incident on the diffraction grating 5 is dispersed, by the aforementioned wavelength dispersing effect of the diffraction grating 5, at a predetermined angle from the diffraction grating 5 in accordance with the wavelength range. As a result, the collimated beam L4 is diffracted by the diffraction grating 5 into different angles for the individual wavelength ranges so that it is converted into a diffracted beam L5 having a different diffraction angle for each wavelength range and incident on the lens 4-2.

Next, the diffracted beam L5, which has been diffracted by the diffraction grating 5 into the different angle for each of the wavelength ranges (i.e., $\lambda 1, \lambda 2, \ldots,$ and $\lambda 6$), is condensed by the lens 4-2 as a converging beam L6 into the micro mirror array 7. The beam thus condensed is focused into an intermediate image I2 on the micro mirror array 7. Here, the focused position of the intermediate image I2 and the focused position of the intermediate image I1 are located at conjugate positions in the optical system, which is configured of the lens 4-1, the diffraction grating 5 and the lens 4-2.

Here, the micro mirror array 7 is so arranged that the converging beam L6 emitted from the lens 6 may be condensed on the mirror surfaces of different micro mirrors 7-1 to 7-6 for the wavelength ranges, namely, that the converging beam L6 in the wavelength range $\lambda 1$ may be condensed on the mirror surface of the micro mirror 7-1, that the converging beam L6 in the wavelength range $\lambda 2$ may be condensed on the mirror surface of the micro mirror 7-2, and that the converging beam L6 in the wavelength range $\lambda 6$ may be condensed on the mirror surface of the micro mirror 7-6.

The micro mirror array 7 is a device, in which the plural micro mirrors 7-1 to 7-6 are arrayed along the X-axis direction. This device is exemplified by the MEMS (Micro Electro Mechanical Systems) system. The plural micro mirrors 7-1 to 7-6 have larger sizes than the spot diameter (i.e., the diameter of the beam L1 to be spectrally separated at the output portion of the input port 1-1) of the intermediate image I2 of the converging beam L6. The micro mirrors 7-1 to 7-6 have a size of about a square of several 10 μm to several 100 μm. Moreover, the individual micro mirrors 7-1 to 7-6 can be independently controlled at the inclination angles of the mirror surfaces by drive signals coming from the driver 23. In accordance with the command from the processor 22, the driver 23 adjusts the individual inclination angles of the micro mirrors 7-1 to 7-6 so that a reflected beam L7 of the converging beam L6 condensed into the micro mirrors 7-1 to 7-6 maybe converted into a collimated beam L8 through the lens 4-2 and may then reach a desired area S1 of the diffraction grating 5.

Here, the position of the desired area S1 on the diffraction grating 5 is predetermined according to the positions of the pairs of the optical fibers 1-2 to 1-5 to be used as the output ports and the trap ports. The processor 22 issues the commands to control the individual inclination angles of the micro mirrors 7-1 to 7-6 so that the reflected beam L6 for each of the wavelength ranges ($\lambda 1$, $\lambda 2$, . . . , and $\lambda 6$) from the micro mirrors 7-1 to 7-6 may reach the area S1 which has been predetermined according to the positions of the pairs of the optical fibers 1-2 to 1-5 to be used as the output ports and the trap ports.

Now, the collimated beam L8 having reached the desired area S1 of the diffraction grating 5 is inversely diffracted in the area S1 so that it goes as a wavelength-multiplied collimated beam L9 into the lens 4-1. Here, the collimated beam L9 is parallel to the collimated beam L4 to enter the diffraction grating 5. Next, the collimated beam L9 goes into the lens 4-1 and becomes a converging beam L10b so that it is focused as the intermediate image I1 at the focal point of the lens 4-1. After having passed through the focal point, the beam is incident as the diverging beam L10b on the lens 3 so that it is collimated into a collimated beam L11. Next, the collimated beam L11 is converged by the micro lenses 2-2 to 2-5 which are arranged to correspond to the optical fibers 1-2 to 1-5 to be used as the output ports and as the trap ports, so that they go into the beam receiving portions of the output ports 1-3 and 1-5 and the trap ports 1-2 and 1-4 located at the focal points of the micro lenses 2-2 to 2-5.

In FIG. 1, the pair of the output port 1-5 and the trap port 1-4 is used as the output port and the trap port. Moreover, a part of the collimated beam L11 is converged by the micro lens 2-5 so that it goes as a converging beam L12 into the beam receiving portion of the output port 1-5. On the other hand, the rest of the collimated beam L11 is converged by the micro lens 2-4 so that it goes as a converging beam L13 into the beam receiving portion of the trap port 1-4.

The beam L13 thus introduced into the trap port 1-4 is detected in its quantity by the sensor 8-2 so that the detection signal is sent to the processor 22. The processor 22 creates a command for controlling the inclination angles of the micro mirrors 7-1 to 7-6 in the directions so that the beam quantity indicated by the detection signal from the sensor 8-2 may approach a set value (i.e., information on the quantity of beam to be discarded) stored in the memory 21, and outputs the command to the driver 23. In response to the command, the driver 23 adjusts the inclination angles of the micro mirrors 7-1 to 7-6. In short, this embodiment makes a feedback control for a predetermined attenuation.

Here will be detailed the attenuation actions of the attenuator device according to this embodiment.

Figure 2:
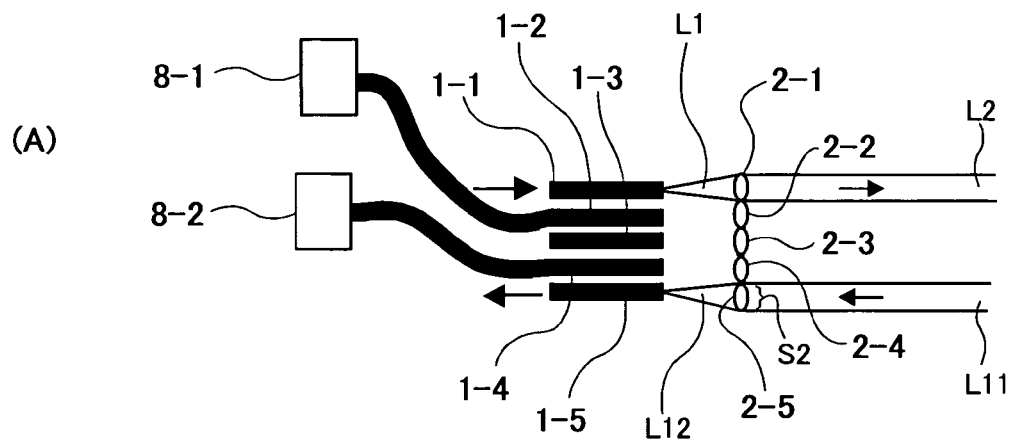
Figure 2:
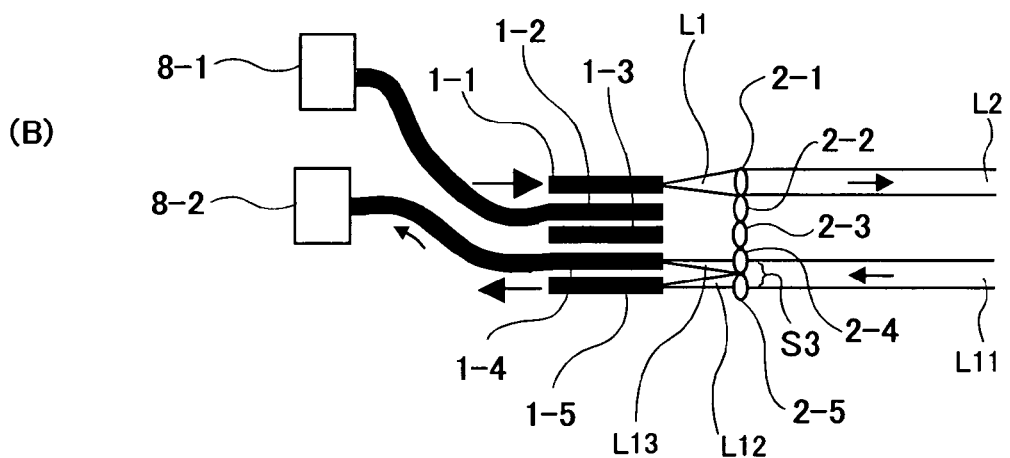
Figure 2:
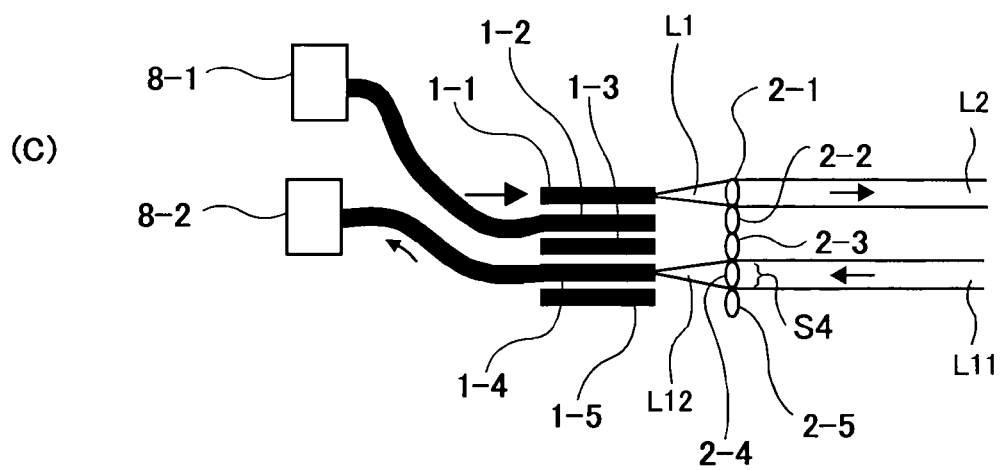

FIG. 2 presents enlarged diagrams of such a portion of the attenuator device according to this embodiment as includes the sensors 8-1 and 8-2, the optical fibers 1-1 to 1-5 and the micro lens array 2. FIG. 2(A) shows the optical path of the case, in which no attenuation is applied, and FIG. 2(B) and FIG. 2(C) show optical paths of the case, in which the attenuation is applied.

In the channel attenuator device according to this embodiment, as has been described hereinbefore, the inclination angles of the micro mirrors 7-1 to 7-6 are adjusted to introduce a part (i.e., the converging beam L13) of the collimated beam L11 emitted from the lens 3 into the trap port 1-4 and the output port 1-5 thereby to attenuate the quantity of the converging beam L12 to be output to the outside.

In the absence of the attenuation, as shown in FIG. 2(A), the collimated beam L11, which is emitted from the lens 3 by the beam L1 to be spectrally separated, as incident from the optical fiber 1-1, is introduced only into an area S2, i.e., the micro lens 2-5 by the controls of the reflection angles of the micro mirrors 7-1 to 7-6 by the driver 23. Therefore, the collimated beam L11 does not receive the attenuation but becomes the converging beam L12 so that it is input to the output port 1-5 and output to the outside.

In the presence of the attenuation, as shown in FIG. 2(B) the collimated beam L11, which is emitted from the lens 3 by the beam L1 to be spectrally separated, as incident from the optical fiber 1-1, is introduced into an area S3 positioned positively farther in the X-direction than the area S2, namely, a part is input to the micro lens 2-4 whereas the rest is input to the micro lens 2-5 by the controls of the reflection angles of the micro mirrors 7-1 to 7-6 by the driver 23. Therefore, the collimated beam L11 becomes the attenuated converging beam L12 so that it is input to the output port 1-5 and output to the outside. On the other hand, the part of the collimated beam L11 to be discarded is introduced as the converging beam L13 into the trap port 1-4 so that the beam quantity is detected by the sensor 8-2.

On the other hand, as shown in FIG. 2(C), the collimated beam L11, which is emitted from the lens 3 by the beam L1 to be spectrally separated, as incident from the optical fiber 1-1, is introduced into an area S4 positioned positively farther in the X-direction than the area S3, namely, the incidence can be made only on the micro lens 2-4 by the controls of the reflection angles of the micro mirrors 7-1 to 7-6 by the driver 23. In this case, the collimated beam L11 is not output from the output port 1-5 to the outside. The collimated beam L11 is input entirely as the converging beam L13 to the trap port 1-4, and its quantity is detected by the sensor 8-2.

In this embodiment, the beam L13, as introduced into the trap port 1-4, is detected in its quantity by the sensor 8-2, and its detection signal is sent to the processor 22. This processor 22 creates the command to control the inclination angles of the micro mirrors 7-1 to 7-6 to the direction, in which the beam quantity indicated by the detection signal from the sensor 8-2 approaches the set value (i.e., the information on the quantity of the beam to be discarded) stored in the memory 21, and outputs the command to the driver 23. In response to this command, the driver 23 adjusts the inclination angles of the micro mirrors 7-1 to 7-6.

One embodiment of the invention has been described hereinbefore.

In this embodiment the output ports and the trap ports are arranged adjacently to each other, and the inclination angles of the micro mirrors 7-1 to 7-6 are controlled, whereby of the collimated beam L11 output from the lens 3, the ratio can be adjusted between the converging beam L12 to be emitted to the output ports and the converging beam L13 to be output to the trap ports. Unlike the channel attenuator device described in the aforementioned Patent Document 1, therefore, the micro mirror array need not be so configured that the diameters of the individual micro mirrors are smaller than the spot diameters of the beams (to be operated) to enter the micro mirror array, and that the multiple micro mirrors are arranged in the spot diameters of the beams to be operated. It is, therefore, possible to provide an attenuator device having a simpler configuration. Moreover, the quantity of beam discarded can be monitored with the simple configuration, in which the trap ports are arranged adjacently to the output ports. Here, the present invention should not be limited to the embodiment thus far described but can be modified in various manners within the scope of the gist thereof. For example, the transparent type planar diffraction grating is used as the diffraction grating 5 in the above-described embodiment but may be modified into a reflection type planar diffraction grating, for example. In this modification, the lenses 4-1 and 4-2 can also be configured of one lens.

In this embodiment, moreover, the inclination angles of the micro mirrors 7-1 to 7-6 may also be so controlled that the diffracted beams may be output to the desired pair of the output port and the trap port for the individual wavelength ranges (i.e., $\lambda 1, \lambda 2, \ldots$, and $\lambda 6$) diffracted by the diffraction grating 5.

In this embodiment, moreover, the inclination angles of the micro mirrors 7-1 to 7-6 may also be controlled to adjust the ratio between the converging beam L12 to be emitted to the output port and the converging beam L13 to be output to the trap port, for the individual wavelength ranges (i.e., $\lambda 1, \lambda 2, \ldots$, and $\lambda 6$) diffracted by the diffraction grating 5.

Moreover, the present invention has been described on the embodiment, in which it is used in the offset-dispersion double spectrograph, but can also be applied to an optical cross connector or a switching element or the like. Here, there is nothing to say that the embodiment is the attenuator device but may also be an optical switching device, which switches the output destination of a beam from an input port. The embodiment can also be applied to another widely used spectroscope. Moreover, the embodiment can be used in the optical path reversed from the embodied one, too. In short, the present invention can also be used such that a beam is input from a plurality of input ports and output from a single output port.

What is claimed is:

1. An attenuator device comprising:
an output port;
a trap port arranged adjacently to said output port;
a diffraction element which diffracts an incident beam in various directions according to a wavelength thereof; and
an output direction adjusting device which adjusts an output direction of a diffracted beam for each of wavelength ranges output from said diffraction element,
wherein said output direction adjusting device adjusts the output direction of said diffracted beam so that said diffracted beam may be output to said output port or said trap port or so that a part of said diffracted beam may be output to said output port whereas the rest may be output to said trap port; and
wherein said trap port traps said diffracted beam for beam quantity detection.

2. An attenuator device of claim 1, wherein:
said output direction adjusting device adjusts the output direction of said diffracted beam through said diffraction element so that a part of said diffracted beam may be output to said output port whereas the rest may be output to said trap port; and
said diffraction element inversely diffracts the diffracted beam which has been adjusted in the output direction by said output direction adjusting device.

3. An attenuator device of claim 2, further comprising:
a detector which detects a quantity of a beam incident on said trap port; and
a control device which controls the adjustment of the output direction of the diffracted beam for each of said wavelength ranges in said output direction adjusting device, according to the detection signal of said detector.

4. An attenuator device of claim 2, wherein:
said output direction adjusting device includes a plurality of micro mirrors configured to have reflection angles made individually adjustable.

5. An attenuator device of claim 4, comprising:
an output optical fiber; and
an output lens to be coupled to said output fiber;
wherein the end face of said output fiber to confront said output lens forms said output port; and
wherein said output direction adjusting device adjusts the output direction of said diffracted beam so that said diffracted beam may be output to said output lens or said trap port or so that a part of said diffracted beam may be output to said output lens whereas the rest may be output to said trap port.

6. An attenuator device of claim 1, further comprising:
a detector which detects a quantity of a beam incident on said trap port; and
a control device which controls the adjustment of the output direction of the diffracted beam for each of said wavelength ranges in said output direction adjusting device, according to the detection signal of said detector.

7. An attenuator device of claim 6, wherein:
said output direction adjusting device includes a plurality of micro mirrors configured to have reflection angles made individually adjustable.

8. An attenuator device of claim 6, comprising:
an output optical fiber; and
an output lens to be coupled to said output fiber;
wherein the end face of said output fiber to confront said output lens forms said output port; and
wherein said output direction adjusting device adjusts the output direction of said diffracted beam so that said diffracted beam may be output to said output lens or said trap port or so that a part of said diffracted beam may be output to said output lens whereas the rest may be output to said trap port.

9. An attenuator device of claim 1, wherein:
said output direction adjusting device includes a plurality of micro mirrors configured to have reflection angles made individually adjustable.

10. An attenuator device of claim 9, comprising:
an output optical fiber; and
an output lens to be coupled to said output fiber;
wherein the end face of said output fiber to confront said output lens forms said output port; and
wherein said output direction adjusting device adjusts the output direction of said diffracted beam so that said diffracted beam may be output to said output lens or said trap port or so that a part of said diffracted beam may be output to said output lens whereas the rest may be output to said trap port.

11. An attenuator device of claim 1, comprising:
an output optical fiber; and
an output lens to be coupled to said output fiber;
wherein the end face of said output fiber to confront said output lens forms said output port; and
wherein said output direction adjusting device adjusts the output direction of said diffracted beam so that said diffracted beam may be output to said output lens or said trap port or so that a part of said diffracted beam may be output to said output lens whereas the rest may be output to said trap port.

12. An attenuator device comprising:
an output port;
a trap port arranged adjacently to said output port;
a diffraction element which combines a plurality of incident beams of different wavelength ranges into one predetermined direction; and
an output direction adjusting device which adjusts an output direction of a diffracted beam output from the diffraction element, wherein:
said output direction adjusting device adjusts the output direction of said diffracted beam so that said diffracted beam may be output to said output port or said trap port or so that a part of said diffracted beam may be output to said output port whereas the rest may be output to said trap port; and
wherein said trap port traps said diffracted beam for beam quantity detection.

13. An attenuator device of claim 12, further comprising:
a detector which detects a quantity of a beam incident on said trap port; and
a control device which controls the adjustment of the output direction of the diffracted beam for each of said wavelength ranges in said output direction adjusting device, according to the detection signal of said detector.

14. An attenuator device of claim 13, wherein:
said output direction adjusting device includes a plurality of micro mirrors configured to have reflection angles made individually adjustable.

15. An attenuator device of claim 14, comprising:
an output optical fiber; and
an output lens to be coupled to said output fiber;
wherein the end face of said output fiber to confront said output lens forms said output port; and
wherein said output direction adjusting device adjusts the output direction of said diffracted beam so that said diffracted beam may be output to said output lens or said trap port or so that a part of said diffracted beam may be output to said output lens whereas the rest may be output to said trap port.

16. An attenuator device of claim 12, wherein:
said output direction adjusting device includes a plurality of micro mirrors configured to have reflection angles made individually adjustable.

17. An attenuator device of claim 16, comprising:
an output optical fiber; and
an output lens to be coupled to said output fiber;
wherein the end face of said output fiber to confront said output lens forms said output port; and
wherein said output direction adjusting device adjusts the output direction of said diffracted beam so that said diffracted beam may be output to said output lens or said trap port or so that a part of said diffracted beam may be output to said output lens whereas the rest may be output to said trap port.

18. An attenuator device of claim 12, comprising:
an output optical fiber; and
an output lens to be coupled to said output fiber;
wherein the end face of said output fiber to confront said output lens forms said output port; and
wherein said output direction adjusting device adjusts the output direction of said diffracted beam so that said diffracted beam may be output to said output lens or said trap port or so that a part of said diffracted beam may be output to said output lens whereas the rest may be output to said trap port.

19. An optical switching device comprising:
an input port which inputs an incident beam having at least one wavelength component from at least one input port;
a plurality of output ports;
at least one discarding port arranged adjacently to at least one of said output ports;
first diffraction element which diffracts said incident beam in various directions according to the wavelength thereof;
output direction adjusting device which adjusts an output direction of a diffracted beam for each of wavelength ranges output from said first diffraction element; and
second diffraction element which applies a diffracting effect opposite to that of said first diffraction element,
wherein said output direction adjusting device adjusts the output direction of said diffracted beam in accordance with at least one of the intensity and the wavelength range of said each diffracted beam so that said diffracted beam may be output to said plural output ports or said at least one discarding port or so that a part of said diffracted beam may be output to said plural output ports whereas the rest may be output to said at least one discarding port; and
wherein said discarding port discards said diffracted beam so that said diffracted beam may not return to the side of said second diffraction element.

20. An optical switching device comprising:
an input port which inputs incident beams each having at least one wavelength component from a plurality of input ports;
at least one output port;
at least one discarding port arranged adjacently to said output port;
first diffraction element which diffracts said incident beam in various directions according to the wavelength thereof;

output direction adjusting device which adjusts an output direction of a diffracted beam for each of wavelength ranges output from said first diffraction element; and second diffraction element which applies a diffracting effect opposite to that of said first diffraction element, wherein said output direction adjusting device adjusts the output direction of said diffracted beam in accordance with at least one of the intensity and the wavelength range of said each diffracted beam so that said diffracted beam may be output to said output port or said discarding port or so that a part of said diffracted beam may be output to said output port whereas the rest may be output to said discarding port; and in that said discarding port discards said diffracted beam so that said diffracted beam may not return to the side of said second diffraction element.

* * * * *